United States Patent [19]
Webb

[11] Patent Number: 5,592,813
[45] Date of Patent: Jan. 14, 1997

[54] HUSH KIT FOR JET ENGINE

[75] Inventor: Lee F. Webb, Russells Point, Ohio

[73] Assignee: Avaero, Safety Harbor, Fla.

[21] Appl. No.: 499,112

[22] Filed: Jul. 6, 1995

[51] Int. Cl.$^6$ .................................................. F02K 3/02
[52] U.S. Cl. ..................... 60/226.2; 60/226.1; 60/262; 60/725; 60/39.02; 415/119; 181/213; 244/110 B
[58] Field of Search .................................. 60/39.02, 226.1, 60/226.2, 262, 725; 415/119; 181/205, 210, 213, 292; 244/110 B

[56] References Cited

U.S. PATENT DOCUMENTS

| | | |
|---|---|---|
| 2,988,302 | 6/1961 | Smith . |
| 3,065,818 | 11/1962 | Lombard et al. . |
| 3,437,173 | 4/1969 | Ehrich ..................................... 181/213 |
| 3,455,413 | 7/1969 | Henley . |
| 3,542,152 | 11/1970 | Adamson et al. . |
| 3,696,617 | 10/1972 | Ellis . |
| 3,739,984 | 6/1973 | Tontini . |
| 3,792,584 | 2/1974 | Klees . |
| 3,819,009 | 6/1974 | Motsinger . |
| 3,821,999 | 7/1974 | Guess et al. ........................... 415/119 |
| 3,861,140 | 1/1975 | Krabacher ................................. 60/262 |
| 3,893,640 | 7/1975 | Hull, Jr. et al. . |
| 4,137,992 | 2/1979 | Herman . |
| 4,217,756 | 8/1980 | Laskody . |
| 4,235,303 | 11/1980 | Dhoore et al. . |
| 4,244,441 | 1/1981 | Tolman . |
| 4,384,634 | 5/1983 | Shuttleworth et al. . |
| 4,401,269 | 8/1983 | Eiler . |
| 4,433,751 | 2/1984 | Bonneau . |
| 4,449,607 | 5/1984 | Forestier et al. . |
| 4,452,335 | 6/1984 | Mathews et al. . |
| 4,543,784 | 10/1985 | Kirker . |
| 4,723,626 | 2/1988 | Carr et al. . |
| 4,751,979 | 6/1988 | Wiseman . |
| 4,759,513 | 7/1988 | Birbragher . |
| 4,817,756 | 4/1989 | Carr et al. . |
| 4,836,469 | 6/1989 | Wagenfeld ............................. 244/1 N |
| 4,909,346 | 3/1990 | Torkelson ............................. 181/213 |
| 5,127,602 | 7/1992 | Batey et al. . |
| 5,440,875 | 8/1995 | Torkelson et al. ..................... 60/226.1 |
| B1 5,127,602 | 5/1995 | Batey et al. . |

OTHER PUBLICATIONS

*Flight*, p. 640, Oct. 17, 1958.
*Overhaul Manual*, Boeing Commercial Jet 65–72778, Nov. 15, 1968.
*Overhaul Manual*, Boeing Commercial Jet 65–27802, May 15, 1969.
*JT3D Thrust Reverser Illustrated Parts Catalog*, Pratt & Whitney Aircraft, Jan. 1, 1970.
*Program on Ground Test of Modified Quiet, Clean, J3D and JT8D Turbofan Engines in Their Respective Nacelles*, Boeing Commerical Airplane Company, NASA NAS CR–134553, Sep. 1973.
*Overhaul Manual*, Boeing Commercial Jet 65–27800, Nov. 10, 1974.
*Overhaul Manual*, Boeing Commercial Jet 65–72778, May 10, 1975.
Blumenthal et al., *Aircraft Community Noise Research and Development: A Historical Overview*, J. Acoust. Soc. Am., vol. 58, No. 1, Jul. 1975.

(List continued on next page.)

*Primary Examiner*—Charles G. Freay
*Attorney, Agent, or Firm*—Wood, Herron & Evans, P.L.L.

[57] ABSTRACT

A hush kit for jet aircraft engine includes a respaced inlet guide vane to provide an increased space between the fixed guide vanes of the inlet and the rotating fan blades of the fan connected to the core engine, a mixer for mixing hot exhaust gas from the core engine with colder bypass fan air, and an acoustic barrel to reduce the noise generated by the mixed air flowing through the thrust reverser downstream of the core engine. The acoustic barrel includes an outer imperforate layer, an inner perforate layer and a multi-cellular core sandwiched therebetween. The ratio of the thickness of the multi-cellular core to the open area defined by the holes in the inner perforate skin of the acoustic barrel is designed to reduce noise of a particular frequency range generated by the aircraft engine. In combination, each of the components of the hush kit described herein reduce noise generated by the jet engine for compliance with Federal Aviation Administration noise reduction requirements.

15 Claims, 4 Drawing Sheets

OTHER PUBLICATIONS

Arctander et al., *Development of Noise–Reduction Concepts for 727 and 737 Airplanes*, J. Acoust. Soc. Am., vol. 58, No. 1, Jul. 1975.

*Overhaul Manual*, Boeing Commercial Jet, 65–27800, Aug. 10, 1975.

*Overhaul Manual*, Boeing Commercial Jet 65–27846, Nov. 10, 1975.

*Overhaul Manual*, Boeing Commercial Jet, 65–27805, Nov. 10, 1977.

Pratt & Whitney Aircraft Group, *JT8D–200 Commercial Installation Handbook*, Section 1, Mar. 1, 1978.

Interavaia, *Pratt & Whitney's JT8D–209 Program*, John F. Brundley, Sep. 1978.

Aviation Week & Space Technology, *Low–Noise 737's*, Apr. 2, 1979.

Geddes, J. Phillip, Interavia, *The DC–9 Super 80*, Sep. 1979.

Interavia, *The Latest 737 Enter Service*, Oct. 1980.

Pratt & Whitney Service Bulletin No. 4127, Rev. 9, Apr. 29, 1981.

*JT8D Maintenance Manual*, Pratt & Whitney Aircraft, Nov. 1, 1981.

*Overhaul Manual*, Boeing Commercial Jet 71–02–01, May 10, 1982.

*Boeing Overhaul Manual*, 173–1010, p. 5, Jul. 5, 1982.

Boeing 737 Service Bulletin Summary No. 737 78–1032, Feb. 17, 1984.

Interavia, *A Quiet Boeing 727–200*, Aug. 1986.

Model Specification, United Technologies Pratt & Whitney, Aug. 1, 1986.

Pratt & Whitney Service Bulletin No. 5897, Rev. 1, Jan. 12, 1990.

Pratt & Whitney Service Bulletin No. 5946, Dec. 13, 1990.

Pratt & Whitney Service Bulletin No. 5950, Rev. 1, Jun. 8, 1992.

Pratt & Whitney Service Bulletin No. 5947, Rev. 3, Jun. 30, 1993.

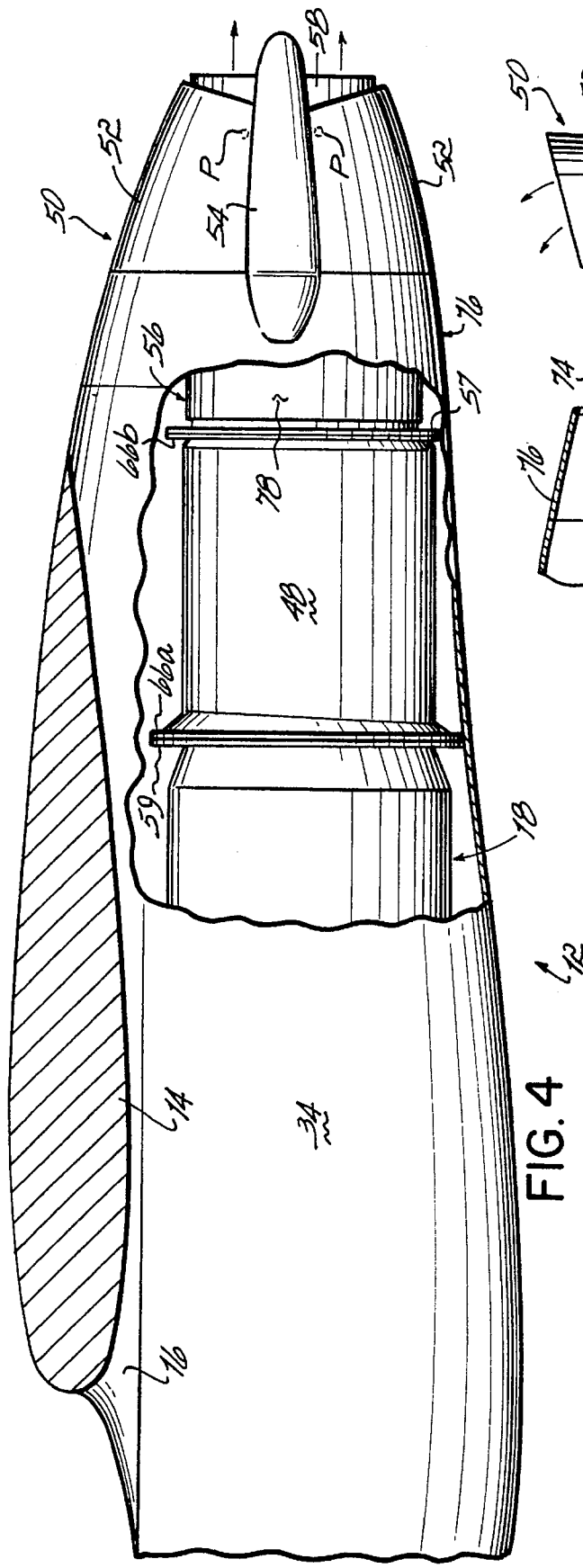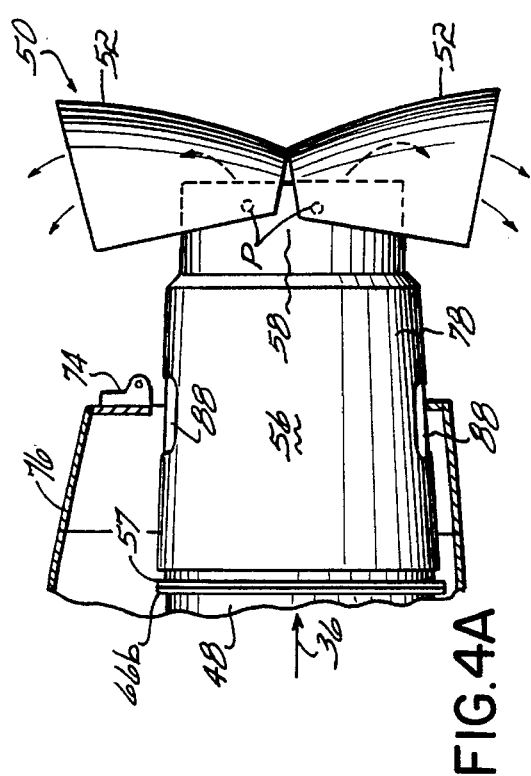
FIG. 4
FIG. 4A

HUSH KIT FOR JET ENGINE

BACKGROUND OF THE INVENTION

The present invention relates generally to jet aircraft turbine engines and, more specifically, to a hush kit for use on an existing engine and airframe.

In view of noise restrictions placed upon the use of aircraft in certain areas and at certain times, a need has existed and continues to exist for quieter aircraft engines. There is a significant need for a method to modify conventional engines on aircraft that presently are in service, since aircraft with such engines often cannot be used economically, because of noise restrictions. Further, jet engines currently in production must satisfy noise restriction requirements.

In December, 1969, the U.S. Federal Aviation Administration (FAA) promulgated specific noise level regulations for aircraft. Similar noise standards were prescribed by international civil aviation organizations, for example, ICAO Annex 16. Thus, it has become imperative for airframe and engine manufacturers and others to take noise considerations into account in designing, building and using jet aircraft.

The major airframe manufacturers and others have undertaken substantial research efforts toward developing retrofit kits for existing airplanes and engines to attempt to meet Federal Aviation Regulation (FAR) 36 noise level requirements. However, kits which would meet the noise level requirements, particularly the more stringent Stage 3 requirements, without degrading performance, increasing fuel consumption and unreasonably increasing costs, were difficult to achieve. This was particularly difficult for the Pratt & Whitney JT8D engines used with the 737 airplanes made by Boeing Aircraft Company.

Studies which had been conducted showed that noise radiates from a bypass, fan jet engine, such as the JT8D engine, in several directions. High frequency fan noise radiates both forward through the air inlet and afterward through the exhaust ducts. Low frequency jet noise generally radiated rearwardly. At low engine thrust, the high pitch wine of the fan is more pronounced while at high engine thrust, a low pitch jet rumble is more noticeable. Each noise component must be addressed in order to meet the FAA noise restriction requirements.

The past efforts to design or retrofit aircraft engines to suppress noise levels have not been fully acceptable or successful. Many of the past designs and retrofits simply have not provided a meaningful noise reduction at a reasonable cost and without a performance penalty.

SUMMARY OF THE INVENTION

Accordingly, it is an object of the present invention to provide a hush kit for retrofit installation on bypass type turbine engines which significantly reduces the noise emanating from the engine, particularly during takeoff and approach operations.

It is a further object of the present invention to provide a retrofit hush kit for a bypass turbine engine which can be installed with a minimum duration of down time and which can be easily maintained for future flight operations.

It is a still further object of the invention to provide a hush kit for retrofit installation on a bypass type turbine engine which does not diminish the performance of the engine nor increase fuel consumption while satisfying FAR noise regulations, such as FAR 36, Stage 3.

A still further object of the present invention is to provide a noise suppression kit for retrofit installation on a bypass type gas turbine engine wherein the kit is specifically adapted for use with a clam shell thrust reverser on a Pratt & Whitney JT8D engine and a 737 airframe.

Additional objects and advantages of the invention will be set forth in the description which follows, and in part will be obvious from the description, or may be learned by practice of the invention. The objects and advantages of the invention may be realized and attained by means of the elements and combinations particularly pointed out in the appended claims.

To achieve the foregoing objects, and in accordance with the purpose of the invention as embodied and broadly described herein, a hush kit for retrofit installation on a bypass type jet turbine engine having a core engine, an outer casing, and a thrust reverser is provided. The noise reduction kit comprises a mixer located downstream of the core engine for mixing fan air with the exhaust gas from the core engine to reduce the velocity of the exhaust gas. An acoustic barrel assembly is configured to define an outlet area for the engine exhaust gas flow path. The acoustic barrel is within the thrust reverser and in one presently preferred embodiment has a multi-layer or sandwich construction. The acoustic barrel has an outer imperforate skin, an inner perforate skin and a multi-cellular core sandwiched therebetween. One aspect of the invention is the relationship of the thickness of the multi-cellular core and the percentage of open area defined by the holes in the inner perforate skin with respect to the frequency range of noise generated by the jet engine. It has been found that the engines can be modified according to the present invention in approximately 478 man hours. Typically, the modified engines can be added to an aircraft in a weekend.

The present invention advantageously meets FAA Stage 3 noise levels at about 50% of the cost of other noise suppression kits without the 6% to 7% fuel penalty associated with known hush kits. Further, the present invention is one of only two kits known to applicant which have received an FAA STC for the JT8D engine on a 737. Further, the present invention meets FAA Stage 3 noise levels, In a presently preferred embodiment, the mixer has an array of axially and radially elongated hot and cold chutes and a fairing for initially directing fan air into the cold chutes and exhaust gas into the hot chutes. Hot exhaust gases from the core engine pass through the hot chutes of the mixer and mix with the cold fan air passing through the cold chutes. The majority of this mixing takes place downstream of the mixer. An acoustic tail pipe extension is provided as a cylindrically shaped spacer having a predetermined length and defining the exhaust gas flow path between the mixer and the thrust reverser.

Preferably, a modified thrust reverser is provided with the hush kit to replace the conventional thrust reverser. The modified thrust reverser is adapted such that the reduced velocity mixture of fan air and core exhaust gases flow smoothly through the thrust reverser without creating a stagnation pointing in the flow path. The acoustic barrel in the thrust reverser does not require modification to the external profile of the thrust reverser. Further, any enlarged tail pipe assembly replaces the tail pipe assembly of the original engine to further reduce the noise level of the jet engine.

BRIEF DESCRIPTION OF THE DRAWINGS

The objectives and features of the invention will become more readily apparent from the following detailed description taken in conjunction with the accompanying drawings in which:

FIG. 4 is a partially broken away side elevational view of the jet engine and hush kit of this invention;

FIG. 4A is a partially broken away view similar to FIG. 4 with the deflector doors of the thrust reverser deployed into a thrust reversing configuration;

DETAILED DESCRIPTION Of THE INVENTION

A presently preferred embodiment of the elements of the hush kit of the present invention have been sized for use on a Pratt & Whitney JT8D engine which is used, for example, on a Boeing 737 aircraft. A description of the hush kit and installation of the preferred embodiment of the present invention will therefore be described with specific reference to that engine. However, it will be recognized by persons skilled in the art that the present invention can be applied to other gas turbine bypass engines.

Figure 1:
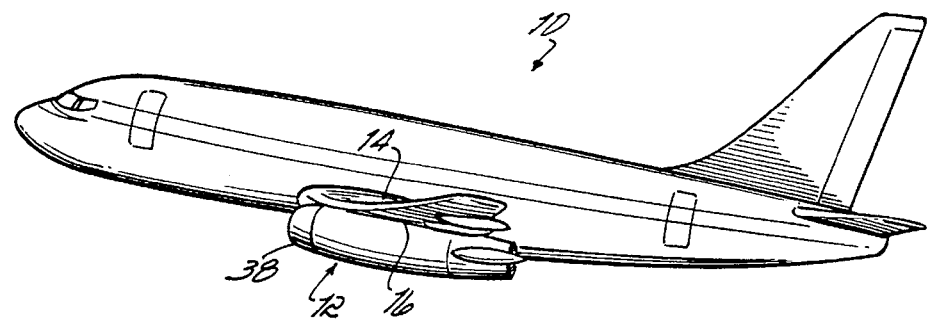
FIG. 1 is a schematic view of a 737 airplane with a jet engine and hush kit according to this invention.

Referring to FIG. 1, a Boeing 737 airplane 10 has a plurality of jet engines 12 suspended from wings 14 of the airplane 10 by pylons 16. Each jet engine 12 contains a core engine 18 for propulsion of the plane 10 and is modified as described and claimed herein to operate at noise levels which meet governmental noise regulations, including particularly FAR 36, Stage 3. Further, the engines 12 and hush kit still maintain air worthiness and structural integrity under other parts of the FAA regulations as certified by the FAA issued Supplemental Type Certificate (STC) approving use of this invention in connection with the Pratt & Whitney JT8D engines on Boeing 737 airplanes.

Figure 2:
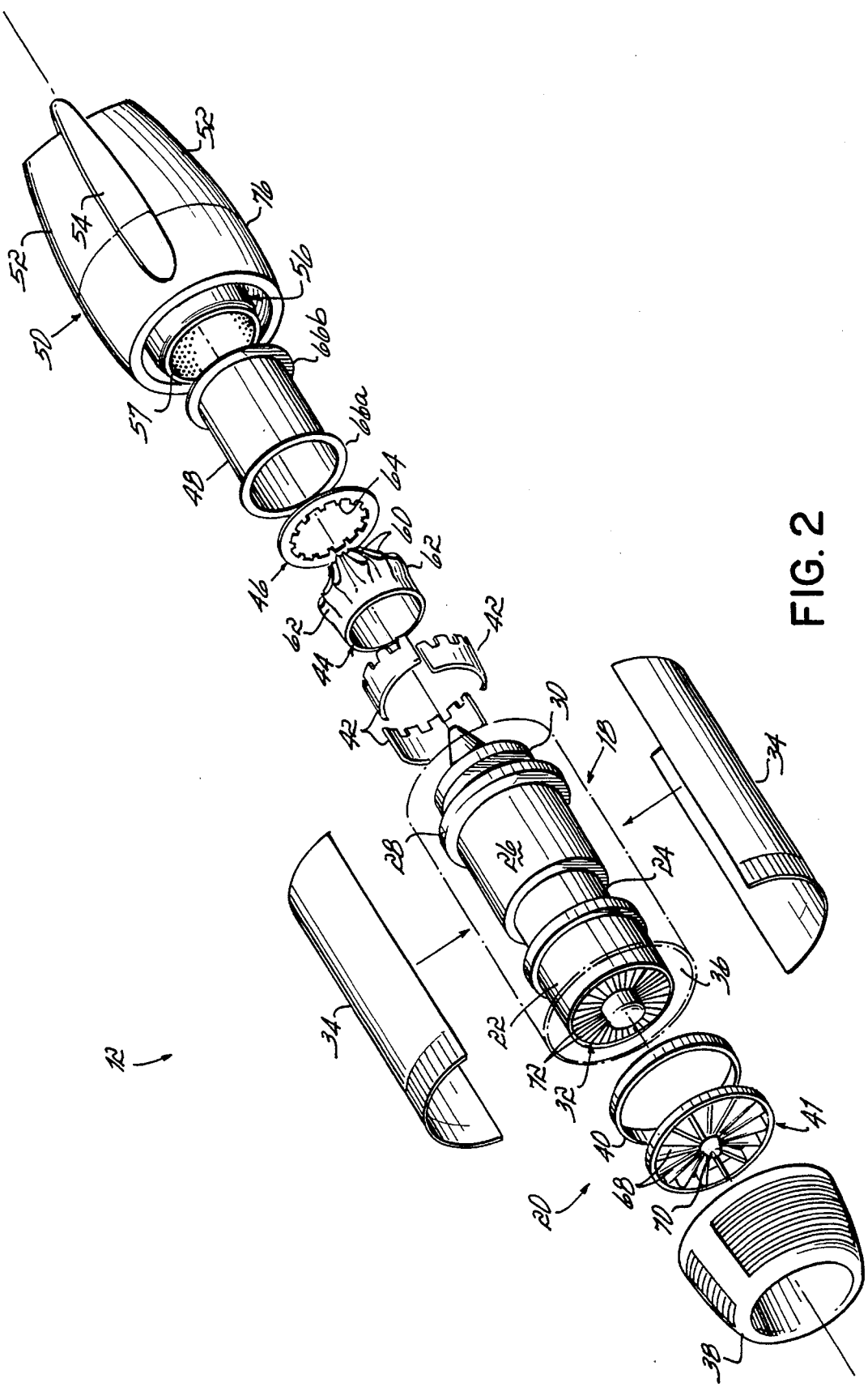
FIG. 2 is an exploded perspective view of the components of the jet engine and hush kit according to a presently preferred embodiment of this invention.

FIG. 2 illustrates an exploded view of a hush kit 20 of the present invention as it fits on the JT8D engine 12. The core engine 18 includes high and low pressure compressors 22 and 24 respectively, a combustor 26, a high pressure turbine 28, and a low pressure turbine 30 aligned in series flow relationship. An upstream fan 32, known in the art as a C-1 fan, precedes the core engine 18 in the engine 12 configuration. The core engine 18 includes a pair of modified cowl doors or nacelle fairings 34 which define an outer casing to provide an annular bypass duct 36 between the casing and the components of core engine 18. The fan 32 is utilized to pressurize a stream of fan air flowing through the bypass duct 36 and about the components of the core engine 18.

The hush kit 20 includes an acoustically treated nose cowl or inlet 38, a respaced inlet guide vane 40, the fan 32, a mixer fairing 42, a mixer 44, a mixer support ring 46, an acoustic tail pipe extension 48, a thrust reverser 50 including a pair of clam shell type deflector doors 52, a pair of thrust reverser track cover 54, an acoustic barrel 56 and a modified tail pipe 58.

The mixer 44 directs fan air into the exhaust gas flow path downstream of the core engine 18. As embodied herein and in accordance with the invention, the mixer 44 includes a number of circumferentially spaced axially and radially elongated lobes which define alternating hot and cold ducts 60 and 62, respectively. As shown in FIG. 2, the cold ducts 62 are on the outside, where the bypass air is located, and the hot ducts 60 are aligned with the interior core where the hot core engine air flows. The mixer 44 is designed to blend fan air passing through the fan duct 36 with core exhaust gas emerging from the downstream low pressure turbine 30 of core engine 18.

As is known in the art and detailed in U.S. Pat. No. 5,127,602, which is hereby incorporated by reference, the mixer 44 reduces peak velocity of the exhaust stream and therefore reduces jet noise. Since thrust noise is a function of the peak velocity of the exhaust gas stream raised to the eighth power, even slight reductions in the peak overall jet velocity result in significant lowering of the engine thrust noise.

Fan air from the bypass duct 36 enters into the cold gas ducts 62 which incline radially inward. The colder bypass gas therefore is directed toward the longitudinal centerline axis of the engine 12. Exhaust gas from the core 18 of the engine flows through the hot gas ducts 60 which have a greater cross section and which incline slightly outward in a radial direction. The hot gas and cold fan air mix downstream of the mixer 44 with the result that the velocity of the mixed gas is less than that of the core gas. This decrease in velocity results in a decrease in noise, since the noise is a function of the maximum air velocity exiting the engine tail pipe 58.

The mixer fairing 42 for initially directing the fan air into cold ducts 62 of the mixer 44 and the hot exhaust gas into the hot ducts 60 of the mixer 44 is provided immediately upstream of the mixer 44. As embodied herein and in accordance with the present invention, the aerodynamic streamlining of the fan stream is achieved with preferably aluminum fairing 42. Preferably, the fairing 42 is provided in three separate 120° arc segments. The fairing 42 initially changes the direction of the fan air stream through fan duct to direct the flow to the inlet of engine cold ducts 62 of the mixer 44 and thereby assist in achieving laminar flow through the downstream portion of the engine 12. The fairing 42 is sized and shaped at its inlet portion to match the engine casing and is sized and shaped at its outlet portion to match the inlet of the mixer 44. As a result, the fairing 42 prevents the mixing of hot and cold gases until the gases flow into the mixer 44.

The mixer fairing 42 is fixed to the mixer by mechanical means, such as screws, as is well known. The mixer mount ring 46 supports and positions the mixer 44 relative to the engine outer casing. The support ring 46 includes a plurality of ring flanges 64. The mixer mount ring 46 is adapted to extend around the mixer 44. Bolts may be used to secure the mixer 44 to the mount ring 46 both axially and circumferentially, thereby fixing the mixer 44 relative to the remaining components of the engine 12. In the preferred embodiment of the present invention designed for the JT8D engine, the mixer fairing 42, mixer 44 and mount ring 46 are as described in Pratt & Whitney Service Bulletin No. 5947.

To ensure that smooth laminar flow is attained in the mixed fan and core gas stream prior to arriving at the thrust reverser 50 which will be described in more detail below, the acoustic tail pipe extension 48 is provided for extending the length of the exhaust gas flow path between the mixer 44 and the thrust reverser 50. As embodied herein, the acoustic tail pipe extension 48 includes a cylindrically shaped spacer having annular flanges 66a and 66b at the upstream and downstream ends, respectively, thereof. The aft flange 66b of the tail pipe extension 48 mates with a forward flange 57 on the acoustic barrel 56 and the forward flange 66a mates with mixer support ring 46.

In the preferred embodiment of the present invention wherein the hush kit 20 is adapted for installation on the JT8D engines, the acoustic tail pipe extension 48 has a length of approximately 42 inches and is a Boeing bill of material Part No. 65-82788-16. The additional distance provided by the acoustic tail pipe extension 48 is realized between the exhaust hardware and mixer and permits sufficient mixing of the low velocity fan air with the high velocity core gases to achieve substantially laminar flow prior to reaching the tail pipe 58. The inner diameter of acoustic tail pipe extension 48 is equal to the inner diameter of the engine 12 at the mating flange 66.

The hush kit 20 of the present invention is preferably designed for application to a Boeing 737 aircraft which has two outboard engines 12. In each outer engine 12, the respaced inlet vane guide 40 is positioned between a ring 41 at the aft edge of the acoustic inlet 38 and the fan 32. The respaced inlet vane guide 40 is an annular ring of about 5.0 inches in axial width. The ring 41 includes a plurality of fixed guide vanes 68 extending radially from a hub 70 which are spaced an additional 5.0 inches from the rotating fan blades 72 by the respaced inlet guide vane 40 to thereby reduce the noise generated by the air passing between the stationary guide vanes 68 and the fan blades 72. The respaced inlet guide vane 40 is preferably as described in Pratt & Whitney Service Bulletin No. 5950 and attached to the engine 12 as described therein. The inlet 38 preferably includes acoustic deadening material as is well known.

According to a presently preferred embodiment of the invention, the acoustic inlet 38 is a Boeing bill of material Part No. 65-85378. Preferably, the fan 32 on the downstream side of the core engine 18 is modified as described in Pratt & Whitney Service Bulletin No. 5946. The cowl doors 34 are the standard design as provided on a Pratt & Whitney JT8D engine, but are modified according to this invention to extend an extra five inches in axial length to account for the extended length of the engine 12 due to the inclusion of the respaced inlet guide vane 40.

The preferred embodiment of the hush kit 20 of the present invention includes the modified thrust reverser 50 as illustrated in FIGS. 2–7. In a conventional JT8D engine 12, exhaust gas from the engine 12 flows directly into the thrust reverser 50 that includes two clam shell type deflector doors 52. The deflector doors 52 are shown in the stowed position in FIGS. 2–4. In a conventional engine, when the deflector doors 52 are hydraulically pivoted about a pivot point P to the closed (as opposed to the stowed) position, the gas flow is then redirected outwardly to provide reverse thrust. The closed position of the deflector doors 52 is shown in FIG. 4A. The deflector doors 52 are releasably secured in the stowed position by a latch actuator 74 on a forward edge of each door 52.

As shown in FIGS. 2–4 and 4A, the hush kit 20 of the present invention includes a thrust reverser shroud 76 which is a cylindrical aerodynamic fairing. This shroud 76 is attached to the thrust reverser frame and covers the acoustic barrel 56 rearwardly to the beginning of the deflector doors 52. A flange 79 is provided on the exterior of the acoustic barrel 56 at the juncture between the shroud 76 and the doors 52. The shroud 76 provides an aerodynamic transition from the engine cowl doors 34 to the thrust reverser 50. The hush kit 20 also includes the thrust reverser track cover 54 providing an aerodynamic fairing and housing for the deflector door actuation mechanism 55 as is well known.

Figure 5:
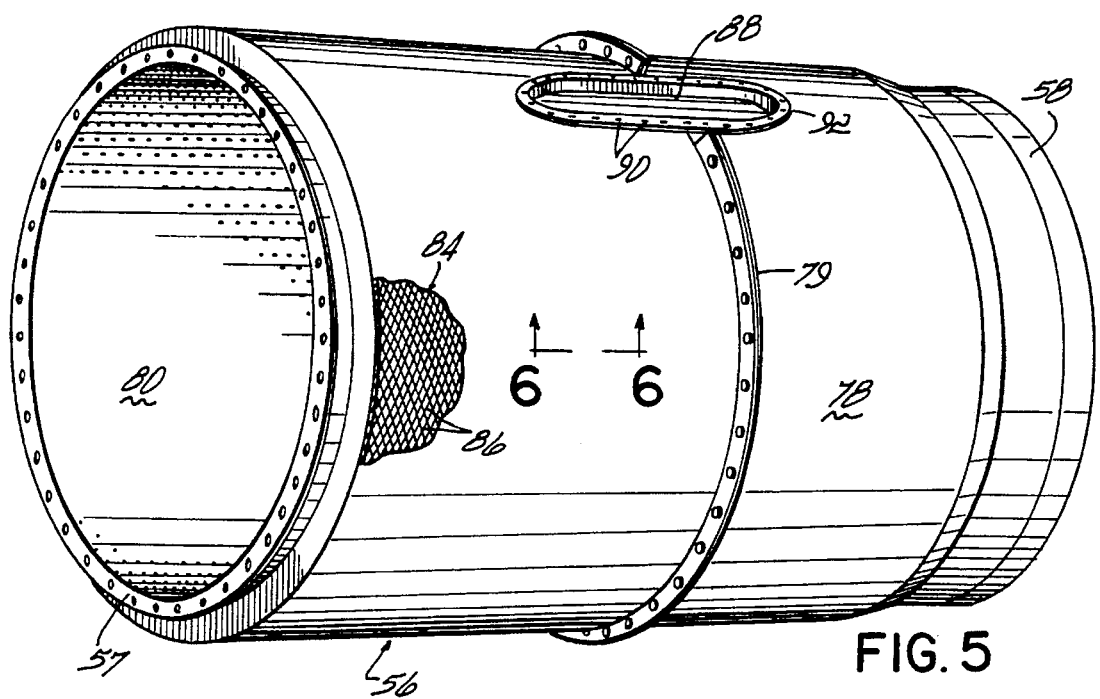
FIG. 5 is a side elevational view of the acoustic barrel according to a presently preferred embodiment of this invention.
Figure 6:
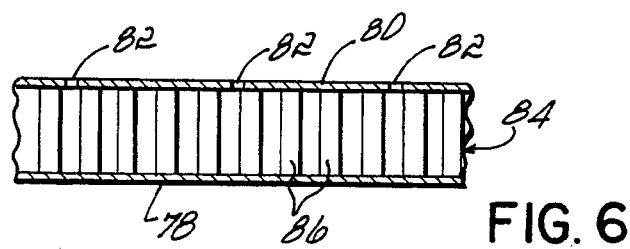
FIG. 6 is a cross-sectional view taken along line 6—6 of FIG. 5.
Figure 7:
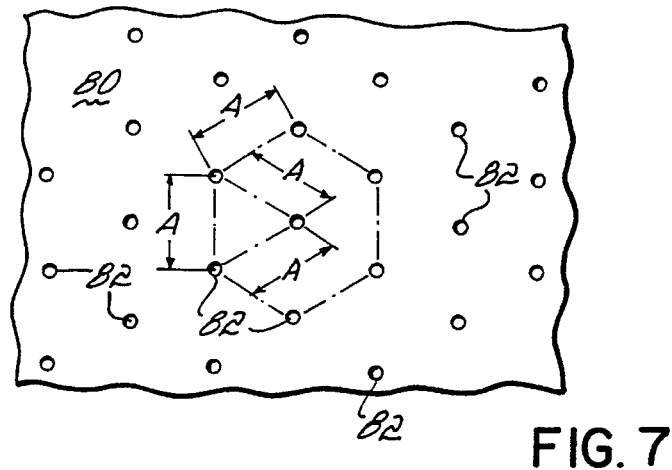
FIG. 7 is an enlarged view of a portion of the inner perforate skin of the acoustic barrel showing the hole pattern therein according to a presently preferred embodiment of the invention.

The external profile of the retrofit thrust reverser 50 as modified according to the present invention is identically sized and configured with respect to the thrust reverser as originally provided with the JT8D engine for use on the 737 airframe. However, the thrust reverser 50 according to this invention is modified to include the acoustic barrel 56 which reduces the noise generated by the jet engine 12 and the airflow through the thrust reverser 50. The acoustic barrel 56 as shown in FIGS. 5–7 is principally an open ended cylindrical member which in cross-sectional configuration, as shown in FIG. 6, includes an outer cylindrical imperforate skin 78, preferably fabricated from INCONEL 625 AMS 5599, an inner perforate skin 80 having a plurality of holes 82, and preferably being fabricated from CRES SHEET TYPE A286 AMS 5525, and a multi-cellular core 84 sandwiched between the inner and outer skins. The multi-cellular core 84 is preferably fabricated from BRAZCOR™ and is available commercially from Aviation Equipment, Inc. of North Hollywood, Calif. In a presently preferred embodiment of the acoustic barrel 56 according to this invention, the thickness of the core 84 is 1.25 inches the cells 86 are ⅜ inch squares with 0.0035 inch wall thickness. It will be appreciated that although the cells are preferably square that other configurations of the cells are possible within the scope of this invention such as honeycomb, octagonal, oval, circular or any other shaped cells.

The spacing identified by reference numeral A in FIG. 7 between adjacent holes 82 on the inner perforate skin 80 is 0.146 to 0.151 inches on center. The holes 82 are preferably evenly spaced on the inner perforate skin 80 and are preferably sized having a diameter of 0.050 inches to provide an overall open area of 10% in a presently preferred embodiment of the inner perforate skin 80. Preferably, the inner skin 80 measures 0.032 inch wall thickness, 36.0 inches inner diameter and 52.0 inches in length. The outer skin 78 is preferably 0.04 inches thick, 38.5 inches inner diameter and 41.5 inches in length.

Through extensive testing and analysis, Applicant has determined that the reduction of noise for a particular frequency range generated by the core engine 18 in the acoustic barrel 56 is a function of two variables; namely, the thickness of the core of the acoustic barrel and the percentage of overall open area provided by the holes of the perforate inner skin. In a presently preferred embodiment of the invention for the JT8D engine, the core 84 is 1.25 inches thick and the open area provided by the holes 82 is 10% of the surface area of the inner skin 80 which is effective for reducing the jet engine noise over a frequency range of 1000 to 1600 hertz (Hz). According to this invention, other combinations of core thickness and percentage of open area in the inner perforate skin 80 of the acoustic barrel 56 can be provided for reduction of noise over a different frequency range generated by other jet aircraft engines. The other components of the hush kit 20 according to this invention, namely, the respaced inlet guide vane 40, the mixer 44, and the acoustic tailpipe extension 48 contribute to the noise reduction of the jet engine 12; however, the acoustic barrel 56 and the relationship between the thickness of the core 84 and the open area provided by the perforate inner skin 80 is an important contributing factor to the reduction of noise of the jet engine 12.

Figure 3:
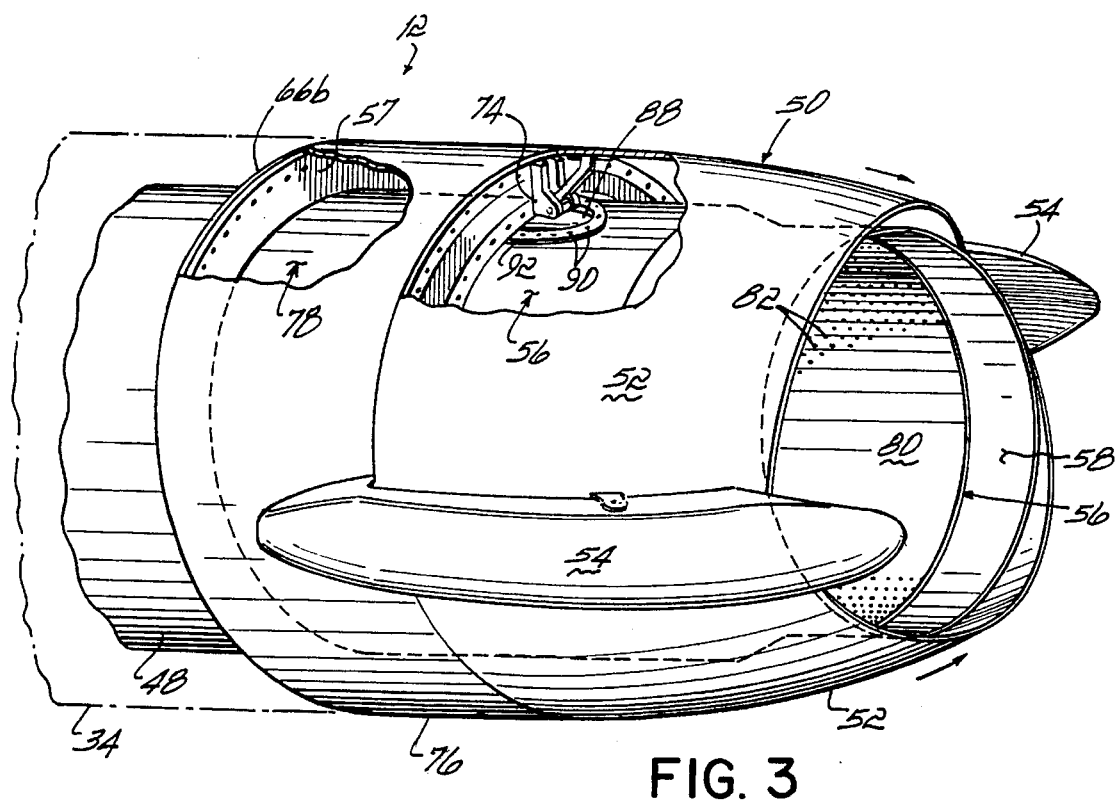
FIG. 3 is an enlarged partially broken away perspective view of the thrust reverser.

To accommodate the increased thickness of the acoustic barrel 56 according to this invention without modification to the thrust reverser 50 and deflector door 52 operation, a socket 88 is provided in the outer skin 78 of the acoustic barrel 56 as shown particularly in FIGS. 3, 4A and 5. The socket 88, which is preferably oval in shape and measures approximately 10 inches in length and about 4 inches in width, provides a recess for the latch 74 of the deflector doors 52 in the thrust reverser 50. A pair of diametrically opposed sockets 88 is provided on the acoustic barrel 56 (only one of which is shown in FIGS. 3 and 5); one for the latch 74 on each of the deflector doors 52. A plurality of rivets 90 or other mechanical fasteners are used to fasten an upper rim 92 of the socket 88 to the outer skin 78 of the acoustic barrel 56. Other modes of attachment and construction of the socket 88 will be readily apparent to those skilled in the art and are considered within the scope of this invention.

The hush kit 20 further includes the modified tail pipe assembly 58 which is configured to have a greater cross sectional area in the exit plane so as to accommodate increased pressure in the flow stream caused by introduction of the various components, primarily the mixer 44, within the exhaust gas flow path. With reference to FIG. 3, the modified tail pipe for a JT8D engine has an inner exhaust diameter of 30.86 inches resulting in an open area of 747.85 square inches in a presently preferred embodiment.

When conventional engines are modified to include the kit 20 of the present invention, the engine 12 will have an extended length. As a result of this extended length, it may be preferable to modify a portion of the aircraft pylon 16 for the engines 12. The design of the modified pylon 16 is largely dictated by the geometry presented by the existing aircraft 10, the modified engine 12, and the required clearance of the thrust reverser 50. Before a modified engine 12 is added to an aircraft 10, the pylon assembly 16 of the aircraft 10 may be modified, as previously described, to provide the appropriate clearances between the pylon 16 and the modified engine 12. The engine 12, with the complete hush kit 20, is then reattached to the aircraft 10 for operation.

From the above disclosure of the general principles of the present invention and the preceding detailed description of a preferred embodiment, those skilled in the art will readily comprehend the various modifications to which this invention is susceptible, Therefore, we desire to be limited only by the scope of the following claims and equivalents thereof.

We claim:

1. A noise reduction assembly for a jet engine having a core engine generating axial exhaust gas flow through a downstream end thereof, an inlet having a plurality of fixed guide vanes at an upstream end of the core engine, an outer casing defining an annular bypass duct surrounding the core engine, a fan positioned downstream from the inlet for generating axial fan air flow through the bypass duct, a thrust reverser for selectively converting axial flow of exhaust gas and fan air into reverse thrust, and a tail pipe disposed to axially receive and discharge the exhaust gas and fan air, the noise reduction assembly comprising:

an annular ring positioned between the inlet and the fan of the core engine, said annular ring providing an increased axial spacing between the guide vanes and the fan to thereby reduce noise generated by the jet engine;

a mixer assembly having a plurality of cold ducts being radially inwardly directed and a plurality of hot ducts being radially outwardly directed, said cold ducts diverting the fan air from the bypass duct inwardly toward an axial centerline of the jet engine and said hot ducts diverting the exhaust gas from the core engine outwardly away from said axial centerline; and an acoustic barrel within the thrust reverser, said acoustic barrel having a sandwich configuration with an outer imperforate skin, an inner perforate skin having a plurality of holes therein and a multi-cellular core positioned between said inner and outer skins, the exhaust gas from the core engine and the fan air from the bypass duct being mixed in said mixer assembly and passing through said acoustic barrel prior to being discharged through the tail pipe to thereby reduce noise generated by the jet engine.

2. The assembly of claim 1 wherein said holes combine to define an open area percentage of said inner perforate skin, said open area percentage and a thickness of said multi-cellular core both being a function of a frequency range of the noise generated by the jet engine.

3. The assembly of claim 1 wherein the thrust reverser has a pair of pivoting clam shell doors on an exterior surface thereof and the inclusion of said acoustic barrel in the jet engine does not require modification to the external configuration of the thrust reverser.

4. The assembly of claim 1 wherein said increased axial spacing between the guide vanes and the fan is about 5 inches as a result of said annular ring.

5. The assembly of claim 1 wherein said holes are evenly distributed on said inner perforate skin.

6. The assembly of claim 1 further comprising:

a pair of sockets formed in the exterior of said acoustic barrel, each said socket being positioned and configured to receive therein a latch mechanism for a pivotal door of the thrust reverser.

7. A jet engine comprising:

a core engine for generating axial exhaust gas flow through a downstream end thereof;

an inlet having a plurality of fixed guide vanes and being positioned at an upstream end of said core engine;

an outer casing defining an annular bypass duct surrounding said core engine;

a fan positioned downstream from said inlet for generating axial fan air flow through said bypass duct;

an annular ring positioned between said inlet and said fan, said annular ring providing an increased axial spacing between said guide vanes and said fan to thereby reduce noise generated by the jet engine;

a thrust reverser for selectively converting axial flow of said exhaust gas and said fan air into reverse thrust;

an acoustic barrel within said thrust reverser, said acoustic barrel having a sandwich configuration with an outer imperforate skin, an inner perforate skin having a plurality of holes therein and a multi-cellular core positioned between said inner and outer skins, said exhaust gas from said core engine and said fan air from said bypass duct passing through said acoustic barrel prior to being discharged from said thrust reverser to thereby reduce noise generated by the jet engine;

a tail pipe disposed to receive and discharge said exhaust gas and fan air;

a mixer assembly having a plurality of cold ducts being radially inwardly directed and a plurality of hot ducts being radially outwardly directed, said cold ducts diverting said fan air from said bypass duct inwardly toward an axial centerline of the jet engine and said hot ducts diverting said exhaust gas from said core engine outwardly away from said axial centerline.

8. The jet engine of claim 7 wherein said holes combine to define an open area percentage of said inner perforate skin, said open area percentage and a thickness of said multi-cellular core both being a function of a frequency range of the noise generated by the jet engine.

9. The jet engine of claim 7 further comprising:

a pair of sockets formed in the exterior of said acoustic barrel, each said socket being positioned and configured to receive therein a latch mechanism for a pivotal door of the thrust reverser.

10. A noise reducer for a thrust reverser of a jet engine having a core engine generating axial exhaust gas flow through a downstream end thereof, an outer casing defining an annular bypass duct surrounding the core engine, a fan positioned upstream from the core engine for generating axial fan air flow through the bypass duct, said thrust reverser selectively converting axial flow of exhaust gas and fan air into reverse thrust, said noise reducer comprising:

an acoustic barrel within the thrust reverser having a sandwich configuration with an outer imperforate skin, an inner perforate skin having a plurality of holes therein and a multi-cellular core positioned between said inner and outer skins, the exhaust gas from the jet engine and the fan air from the bypass duct passing through said acoustic barrel prior to being discharged from the thrust reverser to thereby reduce noise generated by the jet engine.

11. The noise reducer of claim 10 wherein said holes combine to define an open area percentage of said inner perforate skin, said open area percentage and a thickness of said multi-cellular core both being a function of a frequency range of the noise generated by the jet engine.

12. The noise reducer of claim 10 said holes are evenly distributed on said inner perforate skin.

13. The noise reducer of claim 10 further comprising:

a pair of sockets formed in the exterior of said acoustic barrel, each said socket being positioned and configured to receive therein a latch mechanism for a pivotal door of the thrust reverser.

14. A method of reducing noise generated by a jet engine, the jet engine having a core engine generating axial exhaust gas flow through a downstream end thereof, an inlet having a plurality of fixed guide vanes at an upstream end of the core engine, an outer casing defining an annular bypass duct surrounding the core engine, a fan positioned downstream from the inlet for generating axial fan air flow through the bypass duct, a thrust reverser for selectively converting axial flow of exhaust gas and fan air into reverse thrust, and a tail pipe disposed to axially receive and discharge the exhaust gas and fan air, the method comprising:

spacing the guide vanes with respect to the fan by installing an annular spacing ring between the inlet and the fan;

mixing the exhaust gas and the fan air downstream from the core engine and upstream of the thrust reverser;

routing the mixed exhaust gas and fan air into an acoustic barrel in the thrust reverser, said acoustic barrel having a sandwich configuration with an outer imperforate skin, an inner perforate skin having a plurality of holes therein and a multi-cellular core positioned between said inner and outer skins, the exhaust gas from the jet engine and the fan air from the bypass duct passing through said acoustic barrel prior to being discharged from the thrust reverser to thereby reduce noise generated by the jet engine.

15. The method of claim 14 further comprising:

acoustically tuning an open area defined by said holes in said inner perforate skin and a thickness of said multi-cellular core to reduce noise of a particular frequency range generated by the jet engine.

\* \* \* \* \*